April 13, 1965   E. F. HAMILTON   3,178,198
SERVING CART

Filed July 26, 1961   4 Sheets-Sheet 1

INVENTOR.
EARL F. HAMILTON,
BY
Trask, Jenkins & Hawley
ATTORNEYS.

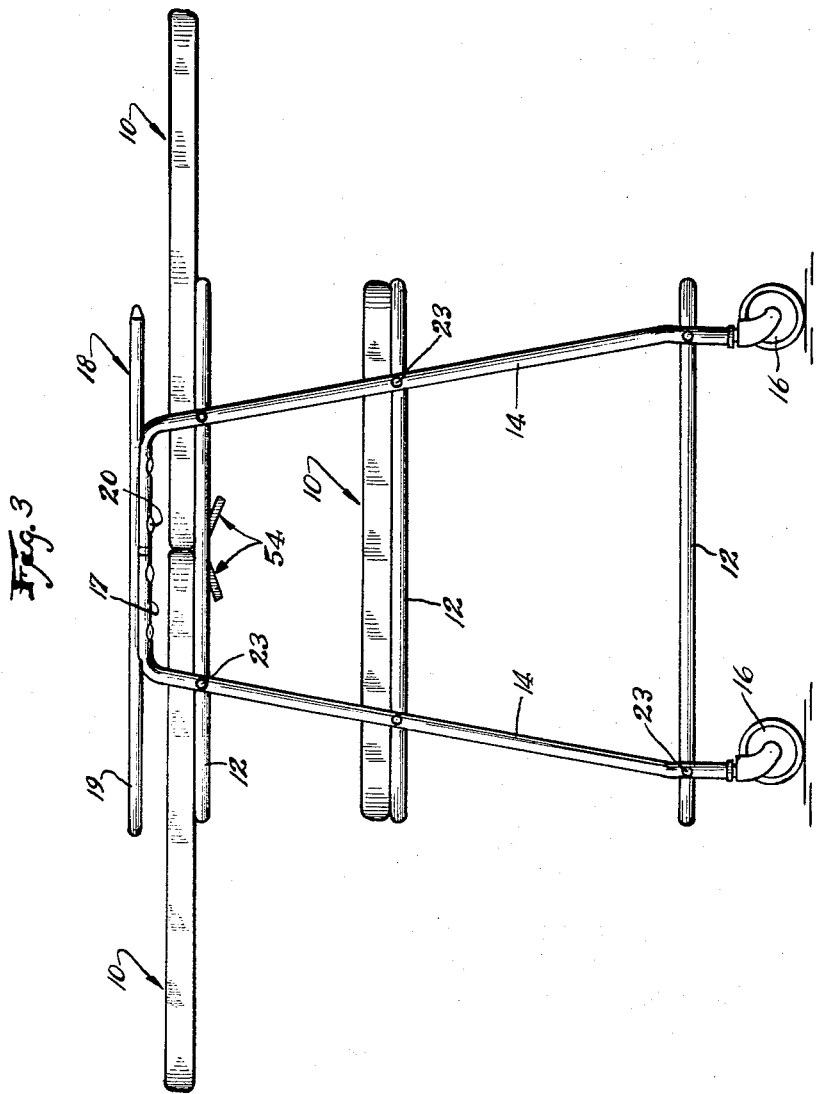

April 13, 1965 E. F. HAMILTON 3,178,198
SERVING CART
Filed July 26, 1961 4 Sheets-Sheet 3
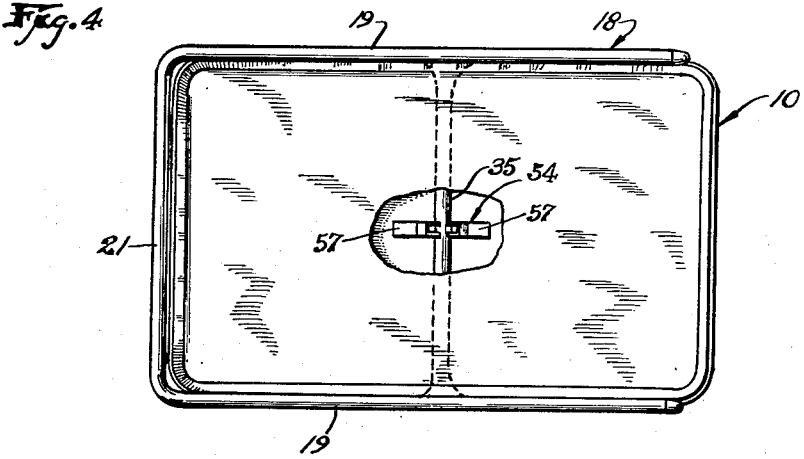
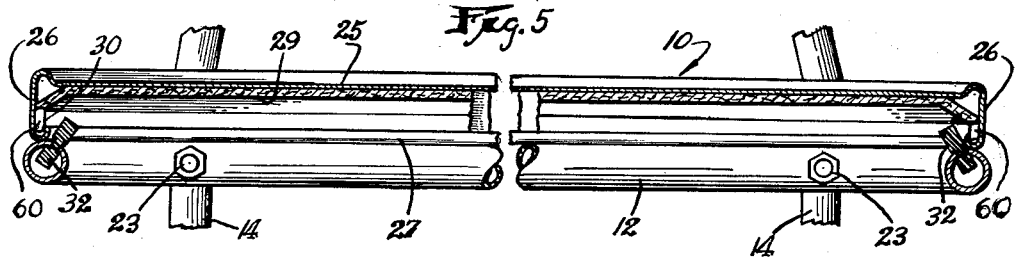
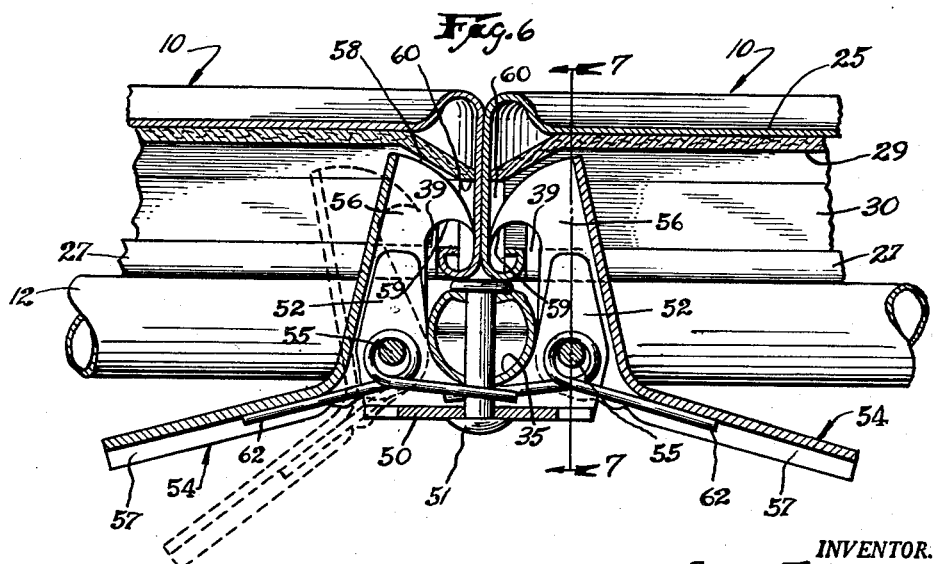
INVENTOR.
EARL F. HAMILTON,
BY
Trask, Jenkins & Hanley
ATTORNEYS.

April 13, 1965 E. F. HAMILTON 3,178,198
SERVING CART
Filed July 26, 1961 4 Sheets-Sheet 4

INVENTOR.
EARL F. HAMILTON,
BY
Trask Jenkins & Hanley
ATTORNEYS.

United States Patent Office 3,178,198
Patented Apr. 13, 1965

3,178,198
SERVING CART
Earl F. Hamilton, Columbus, Ind., assignor to Hamilton Cosco, Inc., Columbus, Ind., a corporation of Indiana
Filed July 26, 1961, Ser. No. 126,948
17 Claims. (Cl. 280—79.3)

This invention relates to a cart, and more particularly to a serving cart of the type used in the kitchenware line of metal furniture.

It is an object of my invention to provide a cart of attractive appearance which can be made largely of economical sheet-metal and metal-tubing, which will provide a plurality of removable shelves, and which will support a pair of said shelves in extended positions projecting outwardly from the cart. It is a further object of my invention to provide a cart which can be quickly and easily assembled lending itself to sale and shipment in a compact knocked-down condition.

In accordance with my invention, there is provided a cart having a plurality of vertically spaced shelf-supporting frames mounted on a plurality of upstanding legs. Each of said frames is adapted to support and releasably retain a shelf thereon. One of said shelf-supporting frames, conveniently the uppermost of said frames, is provided with a cross-bar having one or more brackets mounted thereon to engage and locate a pair of shelves on said frame in an extended position in which their remote ends project outwardly from the opposed ends of said cart. Conveniently, locking means are mounted on said bar for releasably engaging such a pair of shelves to releasably lock the same in said extended position.

Other objects and features of my invention will become apparent from the more detailed description which follows and from the accompanying drawings, in which:

FIG. 3 is a side elevation of the cart shown in FIG. 1, but showing a pair of the shelves in extended position;

FIG. 4 is a plan view of the cart shown in FIG. 1, but with portions thereof being broken away;

FIG. 5 is an enlarged fragmentary vertical section taken on the line 5—5 of FIG. 2;

FIG. 6 is an enlarged fragmentary vertical section taken on the line 6—6 of FIG. 2, but showing a pair of shelves in extended position;

Figure 1:
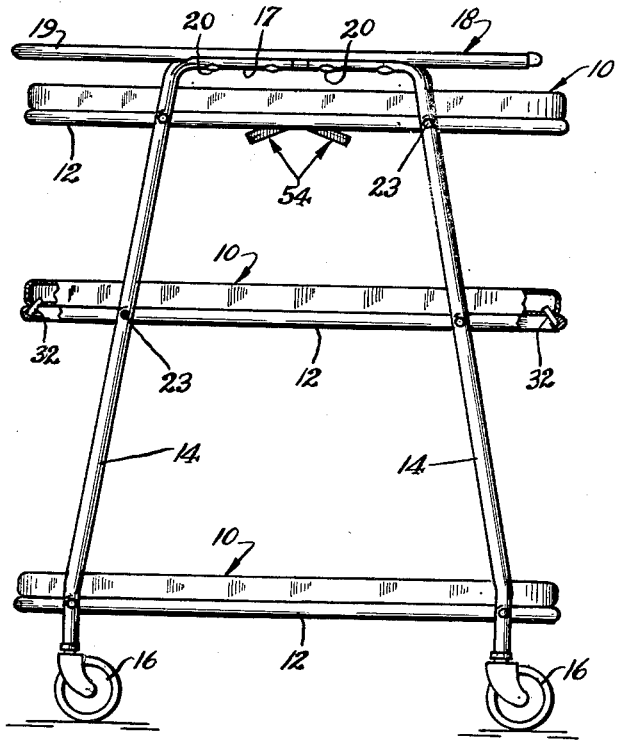
FIG. 1 is a side elevation of a cart embodying my invention, but with portions thereof being broken away.
Figure 2:
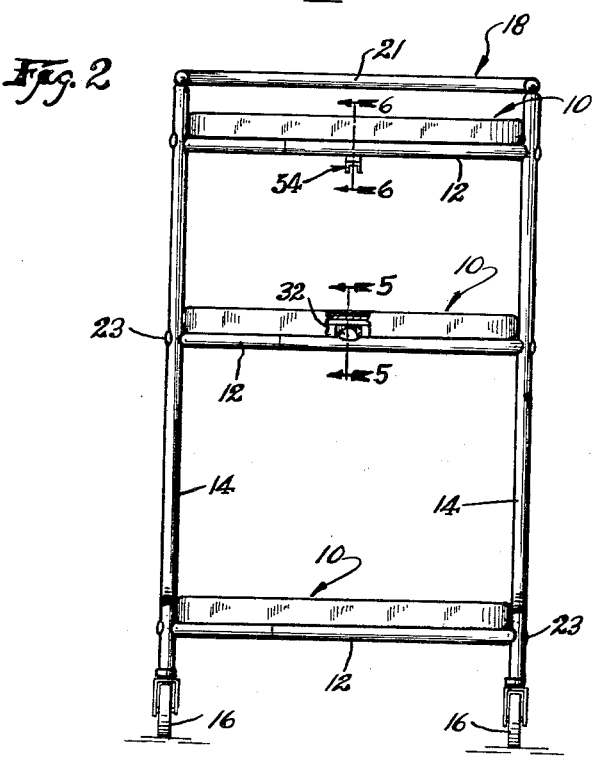
FIG. 2 is an end elevation of the cart shown in FIG. 1, but with portions thereof being broken away.

As illustrated in the drawings, my cart comprises a plurality of shelves 10 removably carried on a plurality of vertically spaced shelf-supporting frames 12 mounted on a plurality of upstanding legs 14. Conveniently, each of the legs 14 constitutes the vertical stretch of an L-shaped length of metal-tubing. The lower end of each of said legs is provided with a caster 16, and the upper end of each of said legs is bent into a generally horizontal plane as at 17. The legs 14 are disposed in opposed pairs on the opposite sides of the cart with the upper ends 17 of the legs in each pair being interconnected above the plane of the uppermost shelf-supporting frame 12. Conveniently, the two pairs of legs are interconnected by a U-shaped tubular frame 18, the legs 19 of which are connected to the leg stretches 17, as at 20, and the transverse medial stretch 21 of which serves as a push bar 21.

The plurality of shelf-supporting frames 12, conveniently formed from lengths of metal-tubing bent into a generally rectangularly shaped configuration, are bolted, as at 23, to the inner faces of the legs 14 at vertically spaced intervals on said legs. The illustrated embodiment of my cart employs three such shelf-supporting frames 12 and three shelves 10, but any desired number of such frames and shelves may be employed.

The shelves 10 are identical in construction and may be interchangeably mounted on the supporting frames 12. Conveniently, each of said shelves is formed from a piece of sheet-metal and is provided with a downwardly dished central portion 25 and a depending peripheral flange 26. The lower end of said shelf flange terminates in an inwardly and upwardly extending bead 27. Conveniently, a silencer 29 of cardboard or any other similar material may be mounted on the underside of each of the shelves 10 as by providing such silencer with downwardly projecting margins 30 receivable behind the flange bead 27.

As shown, each of the shelves 10 has a generally rectangular configuration corresponding to the configuration of the shelf-supporting frames 12 so that their flange beads 27 will rest on the upwardly presented faces of said frames. The shelves are removably carried on the frames 12, but to prevent them from accidentally sliding off of said frames as the cart is moved about, means must be provided to releasably retain them in a fixed position on said frames. To this end, said shelves have a width slightly less than the distance between inwardly presented faces of the opposed pairs of legs 14 whereby said legs will locate the shelves laterally on the frames 12. The shelves are releasably located longitudinally on the frames 12 by resilient snubbers 32 mounted in the ends of the shelf-supporting frames 12 and projecting obliquely upwardly and inwardly from said frames. As shown in FIG. 5, when the shelves 10 are properly centered longitudinally on the frames 12, the snubbers 32 engage the beads 27 on the end stretches of the shelf flanges 26 to releasably retain the shelves in such centered positions. Thus, when a sufficient sliding force is applied to the shelves, the snubbers 32 will be depressed to thus permit the shelves to be slid longitudinally off of the frames 12 and removed from the cart.

In the use of a serving cart of this general type, it is frequently desirable to have a supporting surface of an extent substantially greater than the extent of a single shelf. To this end, I provide means for releasably locking a pair of the shelves 10 in an extended position in which they are disposed in a horizontal coplanar relationship with their adjacent ends abutting each other and their remote ends projecting substantially outwardly beyond the opposed ends of the cart, as illustrated in FIG. 3. Although the means for holding a pair of shelves in extended position is shown in the drawings as being mounted on the uppermost of the shelf-supporting frames 12, it may, of course, be mounted on any of said frames.

Figure 7:
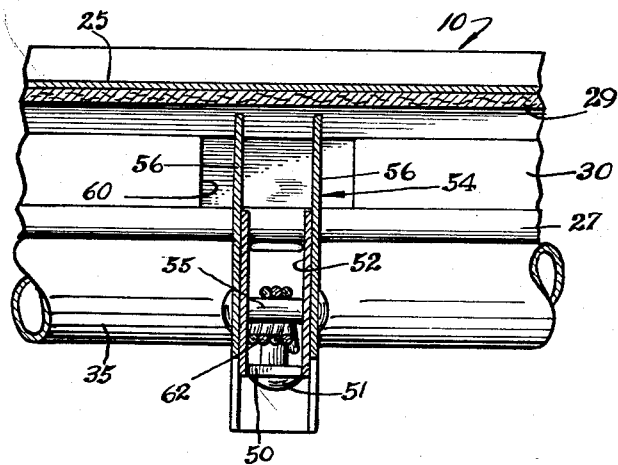
FIG. 7 is a vertical section taken on the line 7—7 of FIG. 6.
Figure 8:
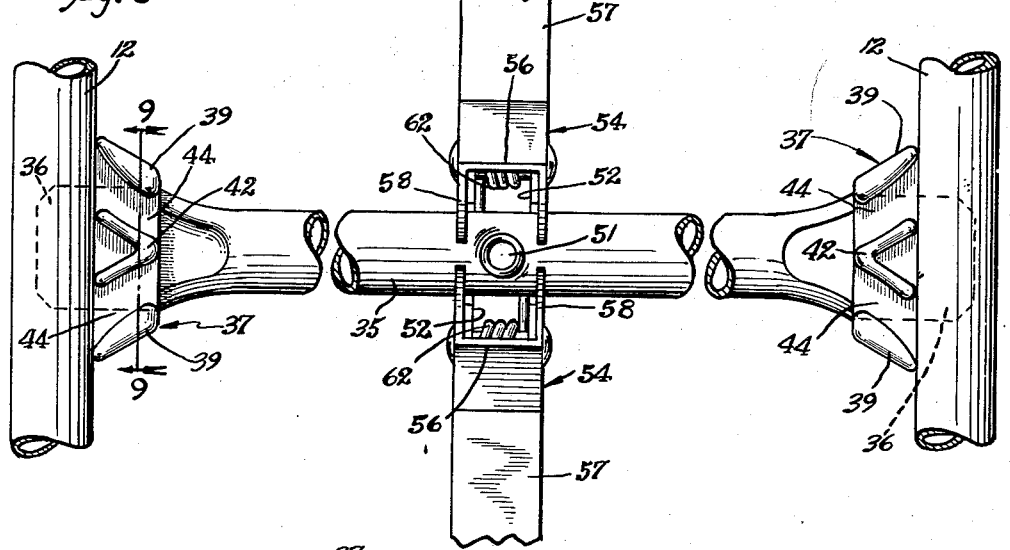
FIG. 8 is an enlarged fragmentary plan view of the locking means for locking the shelves in extended position.
Figure 9:
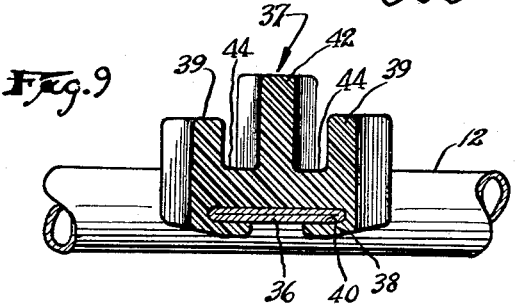
FIG. 9 is a vertical section taken on the line 9—9 of FIG. 8.

As shown in FIGS. 6–9, the means for retaining the pair of shelves in extended position is mounted on a cross-bar 35 conveniently formed from a length of metal-tubing and having its ends flattened into a pair of tongues 36 for reception in a pair of opposed slots formed in the inner faces of the tubing forming the uppermost shelf-supporting frame 12. Desirably, the cross-bar 35 is mounted on the frame 12 intermediate its ends in order that the pair of shelves in extended position will project outwardly equal distances from the ends of the cart. A pair of identical opposed brackets 37 are mounted on the tongues 36 of the cross-bar 35, and as shown in FIG. 9, each of said brackets 37 has a base portion 38 slotted, as at 40, for reception over one of the tongues 36 for mounting it thereon. Conveniently, each of the brackets 37 is formed of a resilient material, and thus may be snapped over and retained on the tongues 36 without the use of any additional fastening means. A pair of laterally spaced arcuate ribs 39 project upwardly from the bracket base portion 38 on opposite sides of a third bracket rib 42 having a generally V-shaped cross-section. In this manner, the spaces between the ribs 39 and 42 define a pair of grooves, as at 44, on each of the brackets for the reception of the flanges 26 on a pair of shelves to locate said shelves in the proper extended position. Desirably, the ribs 39 and 42 which form the side walls of such grooves are contoured to mate with outer and inner faces respectively of the flanges 26 of the extended shelves. The height of the rib 42 is less than that of the shelf flange 26 so that said rib will not interfere with the proper positioning of a shelf 10 on the uppermost frame 12 when said shelf is in its normal position of use as illustrated in FIG. 1.

The pair of shelves 10 are releasably retained in their extended position by the lock illustrated in FIGS. 6-8. As shown, such lock comprises a bracket 50 mounted on the cross-bar 35, as at 51, and provided with pairs of laterally spaced upstanding ears 52 extending upwardly on opposite sides of said cross-bar. A pair of opposed generally L-shaped locking fingers 54 are pivotally mounted on the ears 52 on pivot pins 55 interconnecting each of the pairs of ears 52. Each of the locking fingers 54 has an inverted channel-shaped cross-section and includes an upstanding arm 56 and a downwardly and outwardly angled arm 57. The upper end of arm 56 is curved as at 58 and terminates in a locking notch 59 receivable over the upwardly presented face of one of the flange beads 27. Conveniently, the depending margins 30 of the shelf silencers 29 are cut out as at 60 along the ends of the shelves in order that the notches 59 on the fingers 54 may be received against the shelf flange beads 27. The fingers 54 are urged into their locking position shown in FIG. 6 by springs 62 mounted on the pivot pins 55 with their opposed ends bearing against the bottom faces of the cross-bar 35 and locking finger arms 57.

To move the shelves from their retracted positions as shown in FIG. 1 to their extended position of FIG. 3, the uppermost shelf 10 is slid off of the uppermost shelf frame 12 into the position shown in FIG. 6 in which a pair of corners of its flange 26 are received in the bracket grooves 44 between one of the ribs 39 and the rib 42. As the shelf is placed on the brackets 37, its bead 27 will bear against the curved end 58 of one of the locking fingers 54 to swing said locking finger toward the dotted line position shown in FIG. 6 so that said bead may be disposed against the upwardly presented face of the cross-bar 35. As said bead clears the locking notch 59 on said locking finger, the spring 62 acting on said finger will move it into the locked position shown in full lines in FIG. 6. A second shelf is removed from its respective supporting frame 12 and placed on the uppermost shelf with its flange 26 received in the bracket grooves 44 and locked in position by the other of the pair of locking fingers 54. Thus, with the pair of shelves in the extended position shown in FIGS. 3 and 6, their adjacent ends are disposed in abutting relationship and their remote ends project substantially outwardly beyond the opposed ends of the cart. In such extended position approximately one half of each of the shelves is supported on the uppermost frame 12, cross-bar 35, and brackets 37. However, the fingers 54 being locked over the flange beads 27 prevent any downward force applied to the remote ends of the shelves projecting outwardly beyond the ends of the cart from tilting said shelves relative to the cart.

To release the shelves from such extended position, the locking finger arms 57 are swung downwardly to pivot the fingers about the pins 55 into the dotted line position shown in FIG. 6 to thus free the flange beads 27 from the locking notches 59, thereby permitting said shelves to be removed from the cart to be used as serving trays or to be replaced upon their respective supporting frames 12.

I claim as my invention:

1. In a cart, a plurality of vertically spaced shelf-supporting frames mounted on a plurality of upstanding legs, a plurality of shelves having depending peripheral flanges removably supported on said frames, a bar mounted on one of said frames and having at least one bracket mounted thereon, said shelves being dimensioned with respect to each other and said one frame whereby a pair of said shelves may be placed on said one frame in an extended position with the flanges on their adjacent ends received in said bracket and their remote ends projecting outwardly from the opposed ends of the cart, and means on said bar lockingly engageable with the flanges on said pair of shelves to releasably lock the same in said extended position.

2. In a cart, a plurality of vertically spaced, generally rectangular shelf-supporting frames mounted on a plurality of upstanding legs, a plurality of generally rectangular shelves having depending peripheral flanges and removably supported on said frames, said shelves having lengths and widths approximating the lengths and widths of said frames, a transversely extending bar mounted on the uppermost of said frames, a pair of brackets mounted on said bar adjacent the opposed ends thereof and engageable with the flanges on a pair of shelves when said pair of shelves is placed on said uppermost frame in an extended position in which their adjacent ends overlie said bar and their remote ends project outwardly from the opposed ends of said cart, and means on said bar lockingly engageable with the flanges on the adjacent ends of said pair of shelves to releasably lock the same in said extended position.

3. The invention as set forth in claim 2 in which each of said brackets comprises a member having a base portion secured to said bar, and a plurality of spaced upstanding ribs, whereby said ribs and base portion form a pair of grooves for the reception of the flanges on said pair of shelves.

4. The invention as set forth in claim 2 in which each of said brackets comprises a resilient member having a base portion having a slot formed therein, said bar being received in said slot and retained therein by the resiliency of said bracket, and a plurality of spaced upstanding ribs, whereby said ribs and base portion form a pair of grooves for the reception of the flanges on said pair of shelves.

5. The invention as set forth in claim 2 in which each of said brackets comprises a member having a base portion secured to said bar, a pair of spaced upstanding ribs engageable with the inner faces of the flanges on said pair of shelves, and a third rib interposed between said pair of ribs and engageable with the outer faces of said flanges on said pair of shelves.

6. The invention as set forth in claim 5 with the addition that said pair of ribs are curved to matingly engage the inner faces of the flanges on said pair of shelves at one of their adjacent corners, and said third rib has a generally V-shaped cross-section to matingly engage the outer faces of the flanges on said pair of shelves at said adjacent corners.

7. In a cart, a plurality of vertically spaced, generally rectangular, shelf-supporting frames mounted on a plurality of upstanding legs, a plurality of generally rectangular shelves removably supported on said frames and each provided with a depending peripheral flange having an inwardly projecting bead formed along its lower edge, said shelves having lengths and widths approximating the lengths and widths of said frames, a transversely extending bar mounted on the uppermost of said frames, at least one bracket mounted on said bar and engageable with the flanges on a pair of shelves when said pair of shelves are placed on said uppermost frame in an extended position in which their adjacent ends overlie said bar and their remote ends project outwardly from the opposed ends of said uppermost frame, and means mounted on said bar and lockingly receivable over the beads on the adjacent ends of said pair of shelves to releasably lock the same in extended position.

8. The invention as set forth in claim 7 in which said means comprises a pair of opposed locking fingers pivotally interconnected to said cross-bar and spring-biased toward positions in which they are lockingly received over said beads on said pair of shelves.

9. The invention as set forth in claim 7 in which said means comprises a bracket mounted on said bar and having pairs of opposed ears disposed on opposite sides of said bar, a pivot pin interconnecting each pair of said ears, a generally L-shaped locking finger carried on each of said pivot pins and having a first generally upwardly extending arm and a second arm extending generally downwardly below the plane of said uppermost frame, and a spring on each of said pivot pins acting between said bar and said second arm to urge said finger into a position in which said first arm is lockingly received over the bead on one of said pair of shelves.

10. In a cart, a plurality of vertically spaced, generally rectangular shelf-supporting frames mounted on a plurality of upstanding legs in a horizontal orientation and interconnecting said legs, a plurality of generally rectangular shelves having depending peripheral flanges resting on and supported by said frames, and a plurality of resilient snubbers mounted on said frames and projecting upwardly therefrom to engage the inner faces of the flanges on said shelves for releasably retaining said shelves on the frames.

11. In a cart, a plurality of vertically spaced, generally rectangular shelf-supporting frames mounted on the inner faces of pairs of upstanding legs disposed on opposite sides of the cart, said frames being disposed in a horizontal orientation and interconnecting said legs, a plurality of generally rectangular shelves having depending peripheral flanges resting on and supported by said frames, and pairs of resilient snubbers mounted on the opposed ends of said frames and projecting upwardly therefrom, the inner faces of the flanges at the ends of said shelves being engageable with said snubbers for locating said shelves longitudinally on said frames and outer faces of said flanges along the sides of said shelves being engageable with said legs for locating said shelves laterally on said frames.

12. In a cart, a plurality of vertically spaced, generally rectangular shelf-supporting frames mounted on the inner faces of pairs of upstanding legs disposed on opposite sides of the cart, said frames being disposed in a horizontal orientation and interconnecting said legs, each of said legs having a vertical stretch connected to said frames and a horizontal stretch disposed above the plane of the uppermost of said frames, means interconnecting the horizontal stretches of the pairs of legs on each side of the cart and extending across one end thereof, a plurality of generally rectangular shelves having depending peripheral flanges and slidably supported on said frames, and means on said frames releasably engageable with said shelf flanges for releasably retaining said shelves in fixed positions on said frames.

13. The invention as set forth in claim 12 in which said means interconnecting said horizontal leg stretches comprises a generally U-shaped frame having a pair of parallel arms connected to said horizontal leg stretches and interconnected by a transverse stretch extending across one end of the cart.

14. In a cart, pairs of opposed upstanding legs disposed on opposite sides of the cart and supported at their lower ends on a plurality of casters, a generally U-shaped pushbar connected to said pairs of legs at their upper ends and interconnecting the same, a plurality of generally rectangular shelf-supporting frames mounted on said legs at vertically spaced intervals, a plurality of sheet-metal shelves having depending peripheral flanges supported on said shelves, said shelves having lengths and widths corresponding to the lengths and widths of said frames, means on said frames engageable with said shelves for releasably retaining said shelves in fixed positions thereon, a cross-bar extending across the uppermost of said shelf frames and supporting a bracket adjacent each of its ends adapted to engage the flanges on the adjacent ends of a pair of shelves when said pair of shelves is placed on said uppermost shelf frame in an extended end-to-end position projecting outwardly from the ends of said cart, and locking means on said bar engageable with the flanges on the adjacent ends of said pair of shelves to releasably lock said pair of shelves in said extended position.

15. In a cart, a plurality of vertically spaced, generally rectangular shelf-supporting frames mounted on a plurality of upstanding legs, a plurality of generally rectangular shelves having depending flanges supported on said frames, said shelves having lengths and widths approximating the lengths and widths of said frames, means on said frames for releasably retaining said shelves thereon in positions overlying said frames, and a cross-bar mounted on one of said frames having means carried thereon for mating engagement with the flanges on a pair of said shelves for releasably retaining said pair of shelves on said one of said frames in an extended position when said pair of shelves is placed on said one of said frames with the adjacent ends of said pair of shelves overlying said cross-bar and the remote ends of said pair of shelves projecting outwardly beyond the ends of the cart.

16. In a cart, a plurality of vertically spaced shelf-supporting frames mounted on a plurality of upstanding legs, a plurality of shelves removably supported on said frames and having lengths and widths approximating the lengths and widths of said frames, means for releasably retaining said shelves on said frames in alignment therewith, and means on one of said frames lockingly engageable with a pair of shelves when said pair of shelves is placed on said one of said frames in an extended position in which their remote ends project outwardly from the opposed ends of the cart.

17. In a cart, a plurality of vertically spaced, generally rectangular shelf-supporting frames mounted on the inner faces of pairs of upstanding legs disposed on opposite sides of the cart, said frames being disposed in a horizontal orientation and interconnecting said legs, each of said legs having a vertical stretch connected to said frames and a horizontal stretch disposed above the plane of the uppermost of said frames, means interconnecting the horizontal stretches of the pairs of legs on each side of the cart and extending across one end thereof, a plurality of generally rectangular shelves slidably supported on said frames and each having a central portion bordered by a peripheral flange offset out of the plane of said central portion, and means on each of said frames releasably engageable with the shelf flanges adjacent the opposed ends of each shelf for releasably retaining said shelves on said frames.

References Cited by the Examiner

UNITED STATES PATENTS

| | | | |
|---|---|---|---|
| 2,409,348 | 10/46 | Evans | 211—2 |
| 2,865,646 | 12/58 | Kronhaus | 280—47.35 X |
| 2,875,905 | 3/59 | Tepper et al. | 280—79.3 |
| 2,886,186 | 5/59 | Hamilton | 280—47.35 X |

A. HARRY LEVY, *Primary Examiner.*